United States Patent Office 2,836,620
Patented May 27, 1958

2,836,620

AMINO SULFONIC ACIDS AND SALTS THEREOF

Frederick C. Bersworth, Verona, N. J., and Arthur E. Martell, Northboro, and Roger G. Lacoste, Worcester, Mass., assignors, by direct and mesne assignments, to The Dow Chemical Company, Midland, Mich., a corporation of Delaware No Drawing. Application March 17, 1954
Serial No. 416,953

4 Claims. (Cl. 260—507)

This invention relates to certain new compounds which may be characterized as amino sulfonic acid derivatives of ammonia and their salts.

In the preparation of derivatives of ammonia the recurrence of certain structural entities produces combinations of properties generally manifested in the capacity of the compounds to form chelates. In view of the fact that chelating agents have infinitely diversified uses for purposes of polyvalent metal ion control and the chelation action is fundamental to living processes, the preparation of new and different chelating agents is a matter of industrial technological importance. Further, the usefulness of a compound is enhanced the more cheaply it can be made, and it is, accordingly a basic object of this invention to provide new chelating agents based upon ammonia which are characterized by the simplicity of their synthesis and their cheapness.

It is a further object of the invention to provide chelating agents based upon ammonia which are reacted with low molecular weight alkyl sulfonic acids and thereby have chelating properties.

Other objects and advantages of the invention will in part be obvious and in part appear hereinafter.

This invention, accordingly, is concerned with ammonia compounds corresponding to the following generic formula:

$$X-N\begin{matrix}Y\\Z\end{matrix}$$

wherein X is a methylene sulfonic acid or salt, such as —CH$_2$SO$_3$M— or —CH(Alkyl)SO$_3$M— wherein M is hydrogen, alkali metal, ammonium or amine; Y is X or ortho substituted aryl radicals in which the substituent is —COOH, OH, sulfonic acid or phosphonic acid or alkali metal salts thereof; Z is Y, X, or succinic acid radical.

Typical compounds coming within the scope of the formula are those based upon an aryl ammonia derivative such as aniline in the form of orthanilic acid, amino benzoic acid, amino phenyl phosphonic acid.

The preparation of compounds corresponding to the invention is best understood by reference to the following specific examples:

Example 1

Disodium salt of di-(N-methylene sulfonate) of 2-aminobenzoic acid

.5HCHO + .5NaHSO$_3$ ⟶ .5HOCH$_2$SO$_3$Na

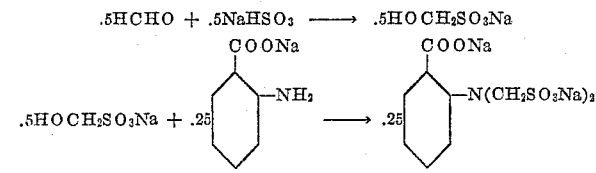

55 parts of NaHSO$_3$ were dissolved in 73 parts water and to this was added 41 parts of 37 percent HCHO.

The reaction mixture was then heated to 65°–70° C. for 30 minutes. The sodium salt of anthranilic acid was prepared by dissolving 10 parts NaOH in 200 cc. water and 150 cc. ethanol and then dissolving 34.3 parts of anthranilic acid in this mixture. The resulting solution was then added dropwise to the reaction mixture and heated to 70°–75° C. with constant agitation for 3 hours. The mixture was then allowed to cool to room temperature and the product extracted with ethanol. Recrystalized from water and alcohol and dried in oven at 110°–120° C. Product is hygroscopic.

To derive other sulfonic acid compounds corresponding to the generic formula, it is necessary to start with the appropriate aryl ammonia derivative.

For example, following the procedure of Example I compounds may be derived as follows:

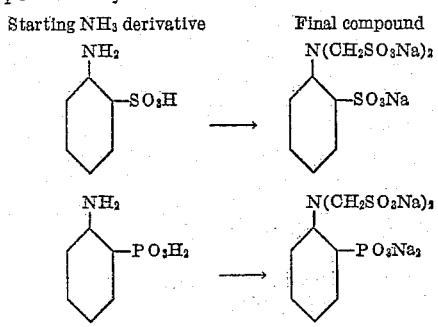

In the several examples given, it is to be noted that the synthesis of this new class of chelating agents is carried out in an alkaline mixture by reacting an appropriate aldehyde with an alkali metal bisulfite to form an alkyl sulfonic acid and thereafter the product is reacted with the appropriate ammonia derivative. Like all organic reactions, maintenance of appropriate reaction conditions will cause the reaction to go in the desired direction to give the particular reaction product. However, side reactions and polymerization reactions occur and it has been found that, in each of the examples of the synthesis, although the particular reaction product can be isolated from the medium in good yield, a test for that reaction product in the reaction medium without isolation indicates the presence of a chelating capacity beyond that which can be attributed to the amount of the main reaction product formed. This is explained by the fact that side reactions forming small amounts of related compounds carry similar combinations of structural entities and are individually effective as chelating agents and, in admixture with the principal reaction product, give a solution that extends the chelating capacity exceeding that attributable to the main reaction product by 10 to 20 percent or more.

The usual measure of the chelating capacity of a solution or compound is in terms of the number of milligrams of copper or other transition metal which it will sequester. Accordingly, quantitative data taken on solutions of the pure compound identified in Example I and on reaction mixtures in which the several other specific compounds occur indicate this excess chelating capacity in the mixtures. For most industrial purposes, such mixture of compounds is adequately useful, for the only requirement is the provision of chelating capacity for the particular application in view.

Heavy metals are sequestered on the basis of one gram ion of heavy metal per gram mol of chelating agent. The formula of the chelating agent is such that three mols of base are required per mole of metal chelate formed, except in case of the phosphonate, where it may be three or four.

Free acid forms of the compounds are prepared by removing alkali metal ions from solutions of the salts, using ion exchange materials, e. g. synthetic resins such as Dowex 50.

Though the preparation has been described in terms of the sodium salts, it is to be understood that any alkali metal salts may be prepared, e. g., potassium, lithium, cesium, rubidium. Ammonium and amine salts also are useful and are prepared by appropriate neutralization of the acid forms of the compounds. Salts of any degree of acidity may be prepared from the free acid by titrating it back to the appropriate point with the appropriate base.

The alkyl sulfonic acid so formed is then reacted with an aryl amine having the appropriate substituents to give the final compound desired. For use in water solution, those compounds having the lower molecular weights are preferred.

Though the syntheses are described in terms of the acids and sodium salts, it is to be understood that any of the alkali metals or ammonium base salts are useful. That is, sodium, potassium, lithium, cesium, rubidium, ammonium and amine salts are all useful and salts of various degrees of acidity may be formed by forming the free acid and neutralizing or titrating it back to a known point.

Though the invention has been described in terms of a limited number of specific examples, it will be understood that variations thereof may be practiced without departing from the spirit or scope thereof.

What is claimed is:

1. Amino sulfonic acid compounds in accordance with the following generic formula:

wherein X is selected from the group consisting of methylene sulfonic acid and alkali metal, ammonium and amine salts thereof; Y is selected from the group consisting of X and ortho substituted phenyl radicals in which the substituent is selected from the group consisting of —COOH, —OH, sulfonic acid and phosphonic acid, alkali metal, ammonium and amine salts thereof; and Z is selected from the group consisting of X and Y, wherein at most only two of said X, Y, Z positions on the nitrogen atom may be occupied by identical sulfonic acid groups.

2. The compound in accordance with the following formula:

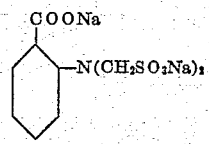

3. The compound in accordance with the following formula:

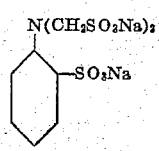

4. The compound in accordance with the following formula:

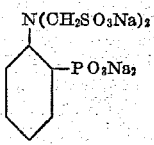

References Cited in the file of this patent

UNITED STATES PATENTS

| | | |
|---|---|---|
| 1,426,348 | Bockmuhl et al. | Aug. 22, 1922 |
| 1,979,033 | Grotowsky et al. | Oct. 30, 1934 |

FOREIGN PATENTS

| | | |
|---|---|---|
| 156,760 | Germany | Nov. 25, 1904 |
| 158,718 | Germany | Feb. 18, 1905 |
| 216,073 | Germany | Nov. 5, 1909 |
| 406,788 | Great Britain | Mar. 8, 1934 |